United States Patent [19]
Barnewall et al.

[11] 3,975,329
[45] Aug. 17, 1976

[54] INDUSTRIAL POLYESTER YARN

[75] Inventors: James M. Barnewall, Munroe Falls; Anthony S. Scheibelhoffer, Barberton, both of Ohio

[73] Assignee: The Goodyear Tire & Rubber Company, Akron, Ohio

[22] Filed: Jan. 2, 1974

[21] Appl. No.: 429,613

[52] U.S. Cl. .................. 260/75 T; 260/45.9 D; 260/75 N
[51] Int. Cl.² ................................. C08G 63/46
[58] Field of Search .......... 260/75 T, 45.9 DI, 75 N

[56] References Cited
UNITED STATES PATENTS

| | | |
|---|---|---|
| 3,193,522 | 7/1965 | Neumann et al. ............ 260/45.9 DI |
| 3,193,523 | 7/1965 | Neumann et al. ............ 260/45.9 DI |
| 3,193,524 | 7/1965 | Holtschmidt et al. ......... 260/45.9 DI |
| 3,193,525 | 7/1965 | Kallert et al. ................. 260/45.9 DI |
| 3,692,745 | 9/1972 | Molenaar ........................ 260/75 T |
| 3,776,882 | 12/1973 | Witzler et al. ................ 260/45.9 DI |

FOREIGN PATENTS OR APPLICATIONS
2,210,119   9/1972   Germany

Primary Examiner—Murray Tillman
Assistant Examiner—W. C. Danison, Jr.
Attorney, Agent, or Firm—F. W. Brunner; J. M. Wallace, Jr.

[57] ABSTRACT

There is disclosed improved hydrolytically and thermally stable industrial polyester yarns prepared by melt spinning a polyester resin in the presence of a carbodiimide selected from the group consisting of mono- and bis-carbodiimides wherein the amount of carbodiimide employed is equivalent to the concentration of COOH groups in the original resin plus the concentration of COOH groups generated when the original resin is extruded in the absence of carbodiimide.

3 Claims, No Drawings

INDUSTRIAL POLYESTER YARN

This invention relates to the preparation of improved industrial type polyester fiber having excellent hydrolytic and thermal stability.

Screens and conveyor belts employed in commercial paper making equipment have heretofore been constructed of wire, and particularly bronze wire. Because bronze wire deteriorates rapidly under the severe flexural stresses existing in said paper making equipment there exists a need for a more durable screen and belt material. Various synthetic plastic fibers and filaments, including those of polyesters, have been tested as replacements for bronze wire in the construction of these screens and belts. However, these synthetic materials have not proven to be entirely satisfactory either because they lacked the necessary hydrolytic and thermal stability and/or physical properties required.

The present invention provides for polyester fibers and monofilaments having improved hydrolytic and thermal stability. More particularly the invention provides for polyester fibers and monofilaments having improved hydrolytic and thermal stability which makes them useful in the construction of screens and conveyor belts employed in commercial paper making equipment.

It has heretofore been known to use compounds containing carbodiimide groups as stabilizers for synthetic plastic materials. Generally carbodiimide compounds have been employed in the synthetic plastic materials in the free state to act as scavengers for water, ammonia, amines, etc. However, the use of carbodiimide compounds, such as the mono- and bis-carbodiimides in the free state has not been entirely satisfactory since these compounds are readily extracted from such plastics by solvents or mineral oils, tend to migrate, exude or bleed out of the compositions to which they are added and are ineffective at high temperatures because of their high volatility. Additionally, the prior art discloses that carbodiimides have a tendency to undergo polymerization reactions with themselves, thereby destroying the reactivity of the carbodiimide group and thus the stabilization action on the composition.

Contrary to these prior art teachings it has now been found that when at least one carbodiimide selected from the group consisting of mono-carbodiimides and bis-carbodiimides corresponding to the formulae R—N=C=N—' and R—N=C=N—R"—N=C=N—R' respectively, wherein R, R' and R" are radicals selected from the group consisting of $C_4$–$C_{20}$ substituted and unsubstituted alkyl radicals, substituted and unsubstituted aryl radicals, said substitutions being selected from the group consisting of halogen atoms, nitro groups, amino groups, sulfonyl groups, hydroxyl groups and alkyl and alkoxy radicals and wherein R, R' and R" may or may not be the same, is added to and allowed to react with polyester resin during the melt extrusion or spinning of said polyester resin in a critical amount defined hereinbelow, the resulting filaments, which are essentially free of unreacted carbodiimide, exhibit improved resistance to hydrolytic and thermal degradation.

In the melt extrusion or spinning of polyester resin to form filaments some degradation of the resin is induced by the mechanical working of the extrusion apparatus and by the pressures and heat used in the process. It has now been found that when a carbodiimide is added to polyester resin, improved fibers are obtained when the carbodiimide is added to the polyester in certain critical concentrations. This critical concentration is an amount equivalent to the concentration of carboxyl groups (i. e. COOH) in the original resin before melt extrusion or melt spinning plus an amount equivalent to the concentration of carboxyl groups generated during the melt extrusion or spinning operation. Amounts greater than this cause degradation. This was unexpected because with most other types of stabilizers an excess causes no problem and usually is beneficial.

The critical amount of carbodiimide required is directly related to the COOH number (i.e. equivalents per $10^6$ grams of resin) as follows:

| I.V. | Resin COOH No. Eq./$10^6$ Grams | Eq. CDI Added | Yarn COOH No. Eq./$10^6$ Grams |
|---|---|---|---|
| 0.995 | 15 | None | 22 |
| 0.995 | 15 | 20 | 5 |
| 0.995 | 10 | None | 16 |
| 0.995 | 10 | 20 | 4 |

In order to obtain the improvement of this invention the starting polyester must be of good quality and should itself have a relatively low carboxyl group concentration. Thus the free carboxyl group concentration of the polyester resin should not be higher than 30 equivalents per $10^6$ grams. The free carboxyl group concentration should be in the range of from 0 to 30 equivalents per $10^6$ grams and the resin should have an intrinsic viscosity of at least 0.75 measured in a 60/40 phenol-tetrachloroethane mixed solvent at 30.0°C. And, as disclosed hereinabove, the amount of carbodiimide used with such polyester will be an amount equivalent to the concentration of COOH groups in the original polyester plus an amount equivalent to the concentration of COOH groups produced in the melt extrusion or spinning operation.

The relationship between the concentration of COOH groups in the original resin before melt spinning and in the fibers produced by said melt spinning is as follows:

| COOH No. of Original Unstabilized Resin | COOH of Yarn from Resin After Melt Spinning |
|---|---|
| 30 | — |
| 25 | — |
| 20 | 26 |
| 15 | 21 |
| 10 | 17 |
| 5 | 11 |
| 0 | 8 |

The following example illustrates the practice of the invention. Parts and percentages are by weight unless otherwise set out.

EXAMPLE

Poly(ethylene terphthalate) resin chips, having a carboxyl group concentration of 11 equivalents per $10^6$ grams, were continuously fed into a one inch extruder at the rate of 8 pounds per hour. Liquid N,N'-di-o-tolylcarbodiimide was injected into the throat of the extruder at the rate of 18 cubic centimeters per hour, using a Model 975 Harvard Apparatus Infusion Pump. The mixture of resin chips and carbodiimide passed into the extruder where they were melted and mixed together and extruded in the form of continuous filaments which had a carboxyl group concentration of 4 equivalents per $10^6$ grams. Residence time in the extrusion apparatus in the section from the throat to the spinnerette was about two minutes.

A conveyor belt made from the above monofilaments was used in the drying section of a commercial paper making apparatus where it was continuously exposed to temperatures up to 175° C. for 150 days. A comparative belt which was prepared from poly(ethylene terephthalate) fibers having a carboxyl group concentration of 11 equivalents per $10^6$ grams, but containing no carbodiimide, failed at 120 days.

The invention has been illustrated particularly with respect to the use of liquid N,N'-di-o-tolylcarbodiimide to improve the hydrolytic and thermal stability of poly(ethylene terephthalate). Representative examples of other useful carbodiimides which can exist in either the solid state or liquid at room temperature include N,N'-di-o-tolylcarbodiimide, N,N'-diphenylcarbodiimide, N,N'-dioctyldecylcarbodiimide, N,N'-di-2,6-dimethylphenylcarbodiimide, N-tolyl-N'-cyclohexylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-dicyclohexylcarbodiimide, N,N'-di-p-tolylcarbodiimide, N,N'-di-p-chlorophenylcarbodiimide, N,N'-di-p-methoxyphenylcarbodiimide, N,N'-di-3,4-dichlorophenylcarbodiimide, N,N'-di-2,5-dichlorophenylcarbodiimide, N,N'-di-o-chlorophenylcarbodiimide, p-phenylene-bis-di-o-tolylcarbodiimide, p-phenylene-bis-dicyclohexylcarbodiimide, p-phenylene-bis-di-p-chlorophenylcarbodiimide, hexamethylene-bis-dicyclohexylcarbodiimide, ethylene-bis-dicyclohexylcarbodiimide, ethylene-bis-diphenylcarbodiimide and the like. The solid carbodiimides can be added to the melt extrusion or spinning apparatus in the form of a powder, as a melt or dissolved in a suitable inert solvent such as xylene, chloroform, o-dichlorobenzene, benzene, toluene and the like. Mixtures of the above carbodiimides can also be employed. It is preferred to use the above carbodiimides in the form of liquids or solutions in inert solvents.

The invention has also been illustrated particularly with respect to the stabilization of poly(ethylene terephthalate). Other high molecular weight linear polyesters and copolyesters prepared by well known polyester forming processes such as those consisting of esterification or transesterification and polycondensation of a dicarboxylic acid or the $C_1$–$C_4$ lower alkyl ester thereof with a glycol of the formula HO—R—OH wherein R is a radical selected from the group consisting of $C_2$–$C_{10}$ straight and branched chain alkyl radicals and cycloalkyl radicals can be stabilized in the same manner. However, the invention is most applicable to poly(ethylene terephthalate) because of the commercial significance of this polyester.

While certain representative embodiments and details have been shown for the purpose of illustrating the invention it will be apparent to those skilled in this art that various changes and modifications may be made therein without departing from the spirit or scope of the invention.

What we claim is:

1. A polyester filament, essentially free of unreacted carbodiimide and having a carboxyl end group concentration ranging from 2–10 equivalents per $10^6$ grams, prepared by melt extrusion of a reaction mixture consisting of
   A. a polyester resin having a free carboxyl group concentration ranging from 0 to 30 equivalents per $10^6$ grams and an intrinsic viscosity of at least 0.75 as measured in a 60/40 phenol/tetrachloroethane mixed solvent at 30° C. and
   B. at least one carbodiimide selected from the group consisting of mono- and bis-carbodiimides corresponding to the formulae R—N=C=N—R' and R—N=C=N—R"—N=C=N—R' where R, R' and R" are substituted and unsubstituted radicals selected from the group consisting of $C_4$–$C_{20}$ alkyl radicals, cycloalkyl radicals and aryl radicals, said substitution being selected from the group consisting of halogen atoms, nitro groups, amino groups, sulfonyl groups, hydroxyl groups and alkyl and alkoxy radicals, wherein said carbodiimide, (B), is present in said reaction mixture in an amount equivalent to the free carboxyl group concentration of the polyester resin, (A), before the melt extrusion thereof plus an amount equivalent to the free carboxyl group concentration generated by the polyester resin, (A), during the melt extrusion thereof in the absence of the carbodiimide, (B).

2. A polyester filament according to claim 1 wherein the polyester resin, (A), is polyethylene terephthalate having a free carboxyl group concentration ranging from 0 to 15 equivalents per $10^6$ grams and an intrinsic viscosity of at least 0.75 as measured in a 60/40 phenol/tetrachloroethane mixed solvent at 30° C.

3. A polyester filament according to claim 2 wherein the carbodiimide, (B), reacted with the polyester resin, (A), is a mono-carbodiimide.

* * * * *